(12) United States Patent
Leidecker et al.

(10) Patent No.: US 6,470,040 B2
(45) Date of Patent: Oct. 22, 2002

(54) ENERGY SUPPLY DEVICE OF A MELTING TANK

(75) Inventors: Hans-Jürgen Leidecker, Zornheim (DE); Ralf Reiter, Mainz-Kastel (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/759,902

(22) Filed: Jan. 12, 2001

(65) Prior Publication Data
US 2001/0019571 A1 Sep. 6, 2001

(30) Foreign Application Priority Data
Jan. 20, 2000 (DE) .......................... 100 02 245

(51) Int. Cl.[7] ............................. C03B 5/027; H05B 7/11
(52) U.S. Cl. .......................... 373/39; 373/103
(58) Field of Search ............................. 373/29, 36, 39, 373/40, 102, 103

(56) References Cited

U.S. PATENT DOCUMENTS

| | | | | |
|---|---|---|---|---|
| 4,069,032 A | * | 1/1978 | Brax | 373/39 |
| 4,247,733 A | * | 1/1981 | Stevenson | 373/39 |
| 4,819,248 A | * | 4/1989 | Varrasso et al. | 373/39 |

* cited by examiner

*Primary Examiner*—Tu Ba Hoang
(74) *Attorney, Agent, or Firm*—Baker & Daniels

(57) ABSTRACT

The invention relates to an energy supply device of a melting tank. According to the invention, between an electrode plane of the melting tank and a converter for the current supply of the electrode plane, a separatable plug connection is provided in the supply line, between the electrode plane and the converter. Thereby in case of a defect of the converter, the supply line can be cut off simply and rapidly, and the converter either tended to or replaced. In an especially advantageous form of execution the energy supply device has a reserve converter so that, on failing of the converter, by unplugging the plug connection and replugging it so as to set up a plug connection to the reserve converter, the energy feed to the electrode plane can be restored within the shortest possible time.

17 Claims, 1 Drawing Sheet

ENERGY SUPPLY DEVICE OF A MELTING TANK

BACKGROUND OF THE INVENTION

1. Field of the Invention

The invention relates to an energy supply device of a melting tank with an electrode plane in the melting tank and a converter for voltage supply of the electrode plane.

2. Description of the Prior Art

In a conventional energy supply device of an optical melting tank the energy feed to the melting tank takes place over the crown of the melting tank by combustion of a fossil energy carrier and furthermore, in the bottom zone of the melting tank by electrodes. The electrodes are arranged in several electrode planes and are supplied with alternating current at a medium frequency of 10 kHz from several converters, in which arrangement to each electrode plane there is associated in each case a converter.

The electrode planes are connected to the converters over energy supply lines and control lines, which are permanently wired. If a converter fails by reason of a technical defect, then the corresponding electrode plane can no longer be operated. Through the absent energy feed of the corresponding electrode plane there occur temperature unbalances in the optical melting tank, so that the tank altogether can no longer be operated. The operation of the entire optical melting tank must consequently be interrupted in order to change or replace the defective converter. Since this latter is firmly wired with the electrode plane, it is necessary for a coworker with training in electricity to disconnect the defective converter either to repair it or to replace it. This complicated repair leads to down times lasting from a few hours to several days.

SUMMARY OF THE INVENTION

The problem of the invention is to further develop an energy supply device of a melting tank in such manner that on failure of an individual converter the down time of the entire melting tank is minimized, and maintenance operations are simplified.

This problem is solved by providing a separatable plug connection between an electrode plane and a converter.

If, in this energy supply device, a converter fails, then same can be electrically separated from the electrode plane by simply pulling-off the plug connection. The severing of the connection can be performed by semi-skilled personnel, without an especially trained electrician being required for the purpose. The separation occurs within an extremely short time and the defective converter can be either repaired or exchanged for a new converter.

By the separation of the current supply line between the converter and in a maintenance operation or a repair, the electrode plane safety is enhanced, since the converter is electrically completely separate from the electrode plane.

In an especially advantageous mode of execution of the energy supply device, the latter comprises a spare converter which likewise can be replaced. If a failure of a converter occurs here, then the supply line between the defective converter and the electrode plane can be rapidly cut off, and the supply line of the electrode plane can simply be changed over to a connection to the reserve converted. It is not necessary, therefore, immediately to repair or replace the defective converter. The down time of the melting tank is now only the time required for the changeover from the defective converter to the spare converter. There is thus ensured a virtually trouble-free operation of the melting tank.

For the further enhancement of the operating security, in a further form of execution the plug connection is equipped with an end contact. The end contact is actuated when the plug connection between the converter and the electrode plane is completely established. The operation of the converter is switched over the end contact, in which process the converter is switched free of voltage and current as soon as the plug connection is cut off. Therewith the corresponding plug connection becomes free of voltage and current, even before the plug connection is completely separated, so that in the event of an inadvertent separation of the plug connection the operating safety of the working personnel is guaranteed.

The end contact can be a mechanical switch or a magnetic switch, such as a reed relay. The end contact can be arranged directly within the plug connection or bordering on this.

If the plug connection is executed as a coaxial plug connection, then the internal conductor is shielded by the outer conductor.

For the further improvement of the safety of operation, the part of the plug connection that leads to the energy-feeding converter is executed as a plug socket. Thereby an inadvertent contacting of current-conducting lines is precluded.

In an especially advantageous form of execution each supply line between a plurality of electrode planes and a corresponding number of converters is connected by a separatable plug connection. Thereby the melting tank can be completely uncoupled from the energy feed of the converters. By the complete separating of the melting tank from the energy feed, the operating safety in the maintenance of the melting tank can be enhanced. There is also possible a complete exchanging of the melting tank or of the converters without any major electrical installation operations.

By the providing of a single spare converter, it is possible to replace the failing converter among the plurality of converters, with the reserve converter, in which operation the down time of the melting tank is further substantially reduced. Since with a plurality of converters only a single spare converter is provided as a reserve, the investment costs and maintenance costs are reduced.

If the plug sockets that are connected with the converters are arranged adjacently to one another, the clarity over the plug connection between the converters and the electrode planes is improved. Therewith there is likewise improved the operating safety and dependability of the energy supply device. Through the central arrangement of the plug connection even semi-skilled personnel can establish or release the plug connection.

For the further improvement of clarity, the plug sockets are grouped in each case adjacently to one another, for example according to functional units of the electrode planes. These functional units of electrode planes are, for example, the use unit "tank", the use unit "crucible" and the use unit "lynching".

In an especially advantageous mode of execution of the energy supply device, the control lines between each electrode plane and its allocated converter likewise are connected over separatable plug connections. Thereby the separating of the converter from the electrode plane is further facilitated.

For the further improvement of clarity, in each case beside a plug socket for the energy supply to the electrode planes there are arranged one or several control plug connections. There, one side of a control plug connection is connected to a control line which is brought together with a plug control line of the electrode plane. Thereby the energy supply line connections and control connections for the converter lie immediately next to one another, and likewise do the supply line and the control lines for the electrode plane, this facilitating the allocation of the connecting element, whereby operating safety is enhanced.

BRIEF DESCRIPTION OF THE DRAWING

With the aid of a drawing, an example of execution of the invention is explained in detail.

DETAILED DESCRIPTION

Figure 1:
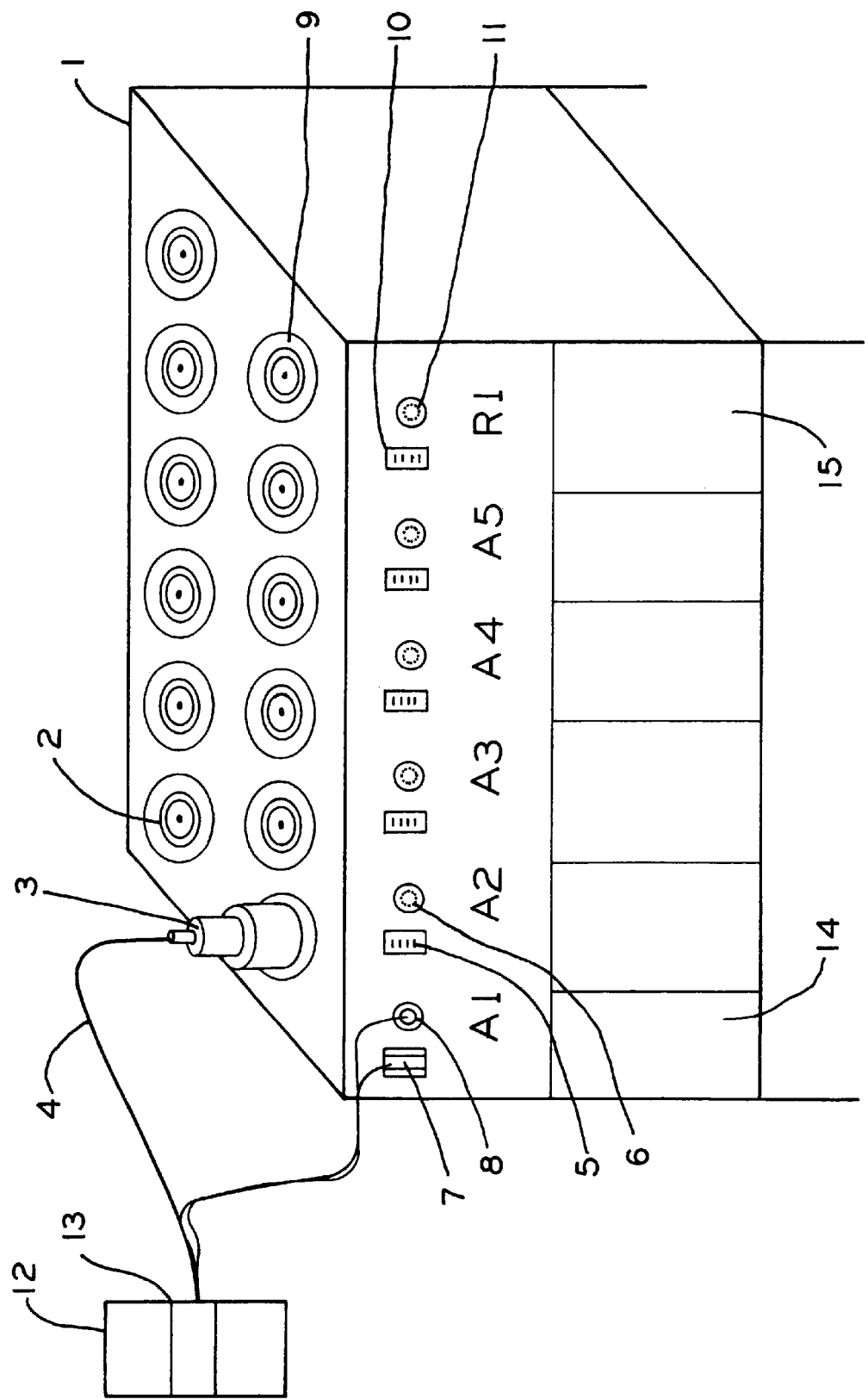
FIG. 1 shows a table unit with plug connections.

In FIG. 1 there is represented a table unit 1 with plug connections. By the table unit 1 there is established the electrical connection between an optical melting tank 12 and primary converters 14 of the optical melting tank u. In the optical melting tank 12, in this example of execution, eleven electrode planes 13 are arranged, each electrode plane 13 being supplied with energy in each case by one converter 14.

On the table-plate of the table unit 1 there are arranged twelve coaxial plug nozzles 2, which are connected in each case with a converter 14 over feed lines. Into the coaxial plug sockets 2, coaxial plugs 3 are pluggable which, over flexible feed lines 4, are connected with, in each case, one of the electrode planes 13 of the optical melting tank.

For the supplying of all eleven electrode planes 13 of the melting tank 12, there run eleven flexible supply lines 4, with in each case one coaxial plug 3, from the melting tank to the table unit 1 and are inserted there into the corresponding coaxial plug sockets 2, whereby the coaxial plug connections 2, 3 are established. In the interest of clarity in FIG. 1 only one plug connection 2, 3 with feed line 4 is shown. Accordingly in normal operation of the melting tank eleven of the twelve coaxial plug sockets 2 are occupied, so that in the table unit 1 shown in FIG. 1 the coaxial plug socket 9 to the right in front is not occupied.

Over the coaxial plug connections 2, 3 and the flexible lines 4 the electrode planes 13 are supplied with alternating current at a medium frequency of 10 kHz. By reason of the high power requirement the coaxial plug socket 2 and the coaxial plug 3, as well as the flexible line 4, are constructed correspondingly thick.

On the front side surface of the table unit 1 shown in FIG. 1, there are represented twelve control plug sockets 5, 6 in each case two of the control plug sockets 5, 6 are assigned to the coaxial plug connection 2, 3 and lie adjacent on the front side of the table plate. On the rear side surface of the table unit 1 there are likewise arranged twelve control plug sockets 5, 6 which are correspondingly allocated to the rearward-located coaxial plug connections 2, 3 (not shown).

Into the first control plug socket 5 there is insertable a first control plug 7. From each of the first control plugs 7 there runs a first control line to the respective electrode plane 13, in which system the control line is brought together with the corresponding flexible supply line 4 for the current supply.

Into the second control plug socket 6 there is insertable a second control plug 8. From each of the second control plugs 8 there likewise runs a second control line to the respective electrode plane 13, the second control line being combined with the first control line and the flexible line 4. By the combining of the flexible line 4 with the first and second control lines there occurs a simple allocation among the lines to the respective electrode plane.

Over the first control plug connections 5, 7, the timing signals are transmitted for the clock control of the respective converter 14. Over the second control plug connections 6, 8, further control signals are transmitted to the converter 14. To these there belong an on/off signal, a readiness-indicating signal, and a control current of 0 to 20 mA.

Into the coaxial plug sockets 2 there are integrated end-contact switches which are switched only on complete plugging of the coaxial plug 3 into the coaxial socket 2. The converters 14 can be operated only when the end-contact switches are switched. On inadvertent releasing of the coaxial plug connection 2, 3, the end-contact switch triggers an emergency shutdown relay which turns off the main switch of the respective converter 14 and therewith the converter itself.

Beside the coaxial plug socket 2 as well as beside the first and second control plug sockets 5, 6 there are arranged identifiers (A1 to A5 and R1 in FIG. 1), which are also correspondingly provided on the coaxial plug 3 as well as on the first and second control plugs 7, 8, so that in the plugging together of the plugging connections a correct allocation occurs.

The table unit 1 is designed in such manner that with connection of all the consumers (electrode planes) on the table unit 1, the coaxial plug socket 9, the first control plug socket 10 and the second control plug socket 11 remain free. The unoccupied coaxial plug socket 9 and the first and second control plug sockets 10, 11 are connected with a spare converter 15 (back-up converter). If one of the converters 14 that supply the connected consumers with energy should fail, then the corresponding coaxial plug 3 and the first and second control plugs 7, 8 can be uncoupled from the corresponding connections of the defective converter 14 and be inserted into the free coaxial plug socket 9 as well as into the first and second control plug sockets 10, 11 of the spare converter 15.

Thereby the table unit 1 forms a shunting distributor on which if necessary, i.e. on failure of a converter, the plug connections 2, 3, 5, 7, 6, 8 are cut off and the flexible supply and control lines 4 are laid to the free coaxial plug socket 9, where the plug connections 9,3; 10, 7; 11, 8 to the reserve converter 15 are established.

In the example of execution shown all of the end-consumers are connected to one table-unit. In a second form of execution the coaxial plug connections 2, 3 are distributed onto several table units, where in each table unit the consumers are sorted out according to groups. For example, in a first table unit there are arranged eleven coaxial plug sockets for the converters of the eleven consumers (tanks) and beside these eleven coaxial plug sockets there are, in each case, corresponding first and second control plug sockets. On a second table unit there are arranged nine coaxial plug sockets with in each case a first and a second control plug socket in order to supply the consumers crucibles and lynches. The supply lines to the consumers (tank) are moved up to the first table unit, where they can be flexibly reconnected among the plug sockets and the reserve plug socket, and the supply line of the consumers crucibles and lynches are displaced running to the second table unit, where they likewise can be replugged flexibly among the plug sockets and the reserve plug socket.

List of reference numbers
1: Table unit
2: Coaxial plug socket

3: Coaxial plug
4: Flexible supply line
5: First control plug socket
6: Second control plug socket
7: First control plug
8: Second control plug
9: Coaxial plug socket
10: First control plug socket
11: Second control plug socket

What is claimed is:

1. Energy supply device of a melting tank with an electrode plane in the melting tank, said supply device comprising: a primary converter for a voltage supply of the electrode plane, a separatable plug connection of a supply line between the electrode plane and the primary converter, and a reserve converter normally not connected to the electrode plane, wherein the supply line of the electrode plane can be changed from the primary converter to the reserve converter.

2. Energy supply device of a melting tank according to claim 1, characterized in that the plug connection has an end contact, in which the end contact is switched on by the coupling of the plug connection.

3. Energy supply device of a melting tank according to claim 1, characterized in that the separatable plug connection is a coaxial plug connection.

4. Energy supply device of a melting tank according to claim 1, characterized in that the separatable plug connection comprises a plug and a plug socket.

5. Energy supply device of a melting tank according to claim 4, characterized in that the plug socket is arranged on a connecting line to a converter and the plug is arranged on the supply line to the electrode plane.

6. Energy supply device of a melting tank according to claim 5, characterized in that an end contact is arranged in the plug socket.

7. Energy supply device of a melting tank according to claim 1, characterized by a plurality of electrode planes and a corresponding plurality of said primary converters.

8. Energy supply device of a melting tank according to claim 7, comprising a plurality of said plug sockets correlating to said plurality of primary converters, wherein said plug sockets are arranged adjacently to one another.

9. Energy supply device of a melting tank according to claim 7, characterized in that the plug sockets are arranged in groups lying adjacent to one another.

10. Energy supply device of a melting tank according to claim 4, characterized in that beside each plug socket there is arranged at least one control plug connection.

11. Energy supply device of a melting tank according to claim 2, characterized in that the separatable plug connection is a coaxial plug connection.

12. Energy supply device of a melting tank according to claim 2, characterized in that the separatable plug connection comprises a plug and a plug socket.

13. Energy supply device of a melting tank according to claim 3, characterized in that the separatable plug connection comprises a plug and a plug socket.

14. Energy supply device of a melting tank according to claim 5, characterized by a plurality of electrode planes and a corresponding number of primary converters.

15. Energy supply device of a melting tank according to claim 2, characterized by a plurality of electrode planes and a corresponding number of converters.

16. Energy supply device of a melting tank according to claim 3, characterized by a plurality of electrode planes and a corresponding number of converters.

17. Energy supply device of a melting tank according to claim 1 wherein said converters are capable of supplying alternating current to said electrode plane at a medium frequency of 10 kHz.

* * * * *